April 15, 1969     C. H. BIBER     3,438,766
ELECTRONIC FLASH APPARATUS HAVING VARIABLE OUTPUT
Filed May 25, 1966     Sheet 1 of 3

INVENTOR.
Conrad H. Biber
BY
Brown and Mikulka
and
John H. Coult
ATTORNEYS

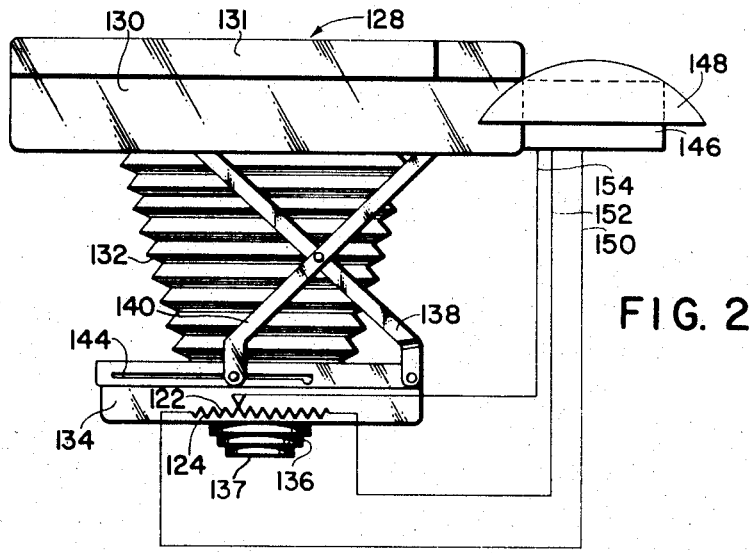
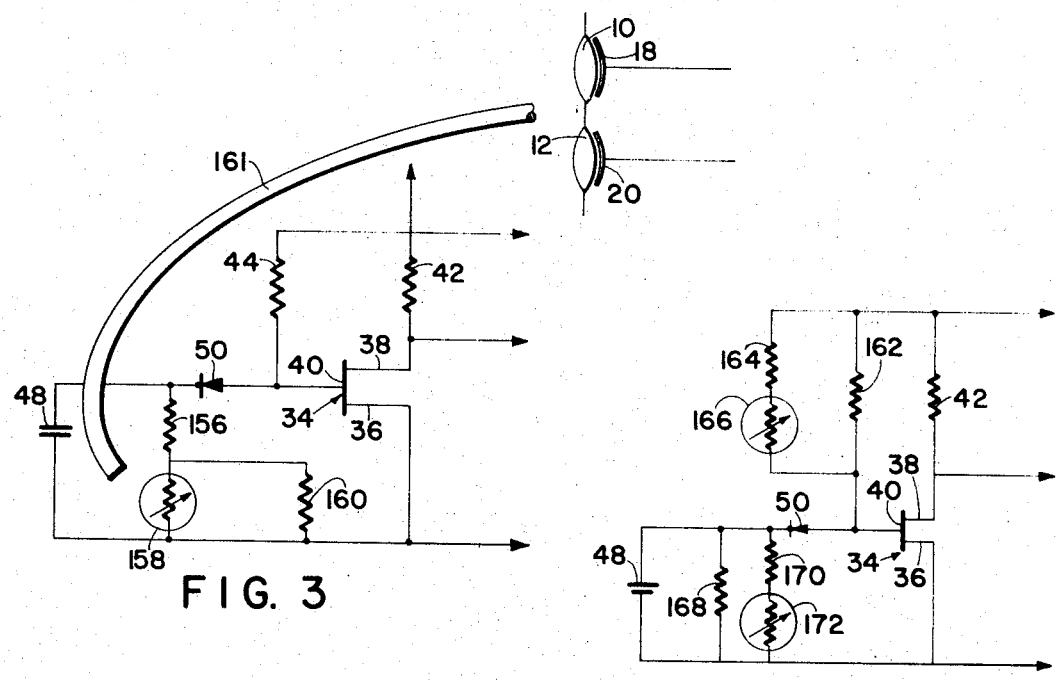

April 15, 1969                    C. H. BIBER                    3,438,766
                ELECTRONIC FLASH APPARATUS HAVING VARIABLE OUTPUT
Filed May 25, 1966                                         Sheet 3 of 3

INVENTOR.
Conrad H. Biber
BY
Brown and Mikulka
and
John H. Coult
ATTORNEYS

United States Patent Office 3,438,766
Patented Apr. 15, 1969

3,438,766
ELECTRONIC FLASH APPARATUS HAVING
VARIABLE OUTPUT
Conrad H. Biber, Needham, Mass., assignor to Polaroid
Corporation, Cambridge, Mass., a corporation of
Delaware
Filed May 25, 1966, Ser. No. 552,920
Int. Cl. G03b 9/70
U.S. Cl. 95—11                                      22 Claims

ABSTRACT OF THE DISCLOSURE

Electronic flash apparatus which produces a succession of periodic light pulses, the number and frequency of which are controlled to regulate the light output thereof. The light pulses are of continually decreasing peak amplitudes. To compensate for illumination drop off with increasing object distances, the pulses are provided so as to increase in frequency with time in an exponential manner.

---

This invention relates to electronic flash photography, and more particularly to electronic flash apparatus having a controlled output and an improved method of electronic flash photography.

In certain photographic flash applications it is expedient and desirable to control exposure by regulating the output of the flash device, rather than solely by means of diaphragm and shutter apparatus. Controlling the nature of the flash output may allow the shutter and/or diaphragm apparatus to be substantially simplified and also makes possible exposures at speeds far in excess of those obtainable by mechanical shutter devices.

One way of controlling the light output from an electronic flash device in response to the level of flash illumination of the scene being photographed involves the use of a high impedance flash tube of the stroboscopic type and a low impedance current-diverting discharge tube connected in parallel across a charged high capacity storage element. The high impedance flash tube may be triggered initially. After a time delay determined by the time constant of an R-C timing network including a photoconductor exposed to the flash-illuminated scene, the second discharge tube is triggered into conduction. The flow of current from the storage element is diverted from the high impedance tube through the low impedance tube, thus quenching the flash produced by the high impedance flash tube.

In such a variable flash system the storage element is completely discharged during each flash operation regardless of the light energy used. This is an inherent characteristic of devices utilizing the current-diversion technique. Second, the light output of such flash devices is a function of the duration of the light pulse produced. Due to the fact that the color temperature of each light pulse produced by the flash tube varies with the duration of the pulse (a characteristic of gaseous discharge devices), such devices produce flash illumination whose effective color temperature is a function of the total light output. In general, the longer light pulses produced at greater subject distances or with dark subjects result in warmer toned photographic records, and the shorter pulses produced by the device when the subject is highly reflective or close to the flash apparatus tend to be cool-toned.

This invention contemplates the provision of electronic flash apparatus which produces a succession of periodic light pulses, the number and frequency of which are controlled to regulate the light output thereof. Such flash apparatus lends itself to manual or automatic output control. For example, for use with cameras having light responsive, electronically controlled shutter apparatus incapable of responding satisfactorily to the very brief pulse produced by conventional electronic flash devices, a controlled light output of predetermined duration may be preselected. The interval during which light pulses are produced is selected to be at least co-extensive with the normal operating capabilities of the electronic shutter apparatus with which the flash apparatus is used.

Automatic control of the light output, for example, might be made to be a function of the level of flash illumination of the scene being photographed, as with an integrating circuit including a photoconductor. In another desirable embodiment the duration over which the pulses are produced may be made responsive to the focusing apparatus for the associated camera such that the number of light pulses produced is a function of the subject distance, as fixed by the focusing system.

In flash apparatus as described utilizing this invention each pulse is of constant width and thus the problem of variations in color temperature with the total light output is eliminated.

Flash apparatus producing a succession of light pulses may utilize a reservoir capacitor for energizing the discharge tube or tubes employed to generate the flash light. The potential appearing across the reservoir capacitor decreases exponentially by decrements during the flash period. Thus light pulses of ever-decreasing peak amplitudes are produced. Further, because of the rapid decrease in illumination with increasing flash-to-subject distances, it is necessary that the light output of the flash apparatus be made to increase correspondingly for greater subject distances. In order to compensate for the drop-off in illumination with increasing subject distances and the effect of decreasing reservoir capacitor voltage, such apparatus may be advantageously adapted to provide pulses increasing in frequency with time, as by an exponential function. A further advantage of increasing the frequency of the light pulses with time is that at close subject distances, wherein the total flash light required to sufficiently illuminate the subject may be relatively small, the pulses will be spaced further apart than at extreme subject distances. Thus, in shutter structures utilizing, for example, a two-blade system, the effects of the lag time of the closing blade are minimized.

Accordingly, it is a primary object of this invention to provide an improved photographic flash apparatus and method for producing a series of light pulses over a controlled exposure interval.

It is another object of this invention to provide a photographic flash apparatus and method for producing a series of light pulses at a frequency which increases with time.

It is a further object of this invention to provide flash apparatus for use with a photographic camera having an objective lens and means for focusing the lens, the flash apparatus being co-ordinated with the focusing means to produce a series of light pulses over a duration dependent upon the subject distance as derived from the focusing means.

It is yet another object of this invention to provide photographic flash apparatus for producing series of light pulses over a duration which is a function of the light level of a flash-illuminated subject.

It is another object of this invention to provide photographic flash apparatus for producing a series of light pulses which includes frequency varying means for causing the frequency at which the pulses are produced to increase exponentially with time.

Briefly, one structural implementation of the invention may include a photoflash apparatus having a pair of serially connected discharge tubes energizable from a reservoir capacitor connected across both tubes. A control circuit is provided for controlling the light output from the discharge tubes. The control circuit may include a square wave generator supplying a square wave output to an emitter follower stage and a phase inverter stage. Square wave signals are fed from the emitter follower and phase inverter stages to voltage pulse generating means. The pulse generating means generates trigger pulses which are are applied alternately to starter electrodes of the discharge tubes. Thus the control circuit effects and alternate triggering of the discharge tubes to produce a pulsed light output.

To increase the frequency of the light pulses during selected exposure intervals, an R-C timing network comprising part of the square wave generator may include resistance means having a characteristic which decreases with time. For example, a photoconductor having a slow response time may be used in the timing network, being photically stimulated by light piped from the discharge tubes. With a properly selected photoconductor, an approximately exponential increase in the frequency of the square wave output from the square wave generator, and hence the light pulse frequency, will be effected. Time delay means may be included for manually or atuomatically regulating the duration over which the light pulses are produced.

Other objects of this invention will in part be obvious and will in part appear hereinafter.

The invention accordingly comprises the apparatus possessing the construction, combination of elements and arrangements of parts which are exemplified in the following detailing disclosure, and the scope of the application of which is indicated in the claims.

For a fuller understanding of the nature and objects of the invention, reference should be had to the following detailed description taken in connection with the accompanying drawings wherein:

FIG. 2 illustrates a photoflash-equipped camera having means for controlling the circuit shown in FIGURE 1 in accordance with focusing adjustments of the camera;

FIG. 3 is a partial schematic diagram illustrating means for varying the frequency of the light pulses produced by the discharge tubes in accordance with an aspect of this invention;

FIG. 4 is a schematic diagram of an alternate embodiment of a frequency varying means;

Figure 1:
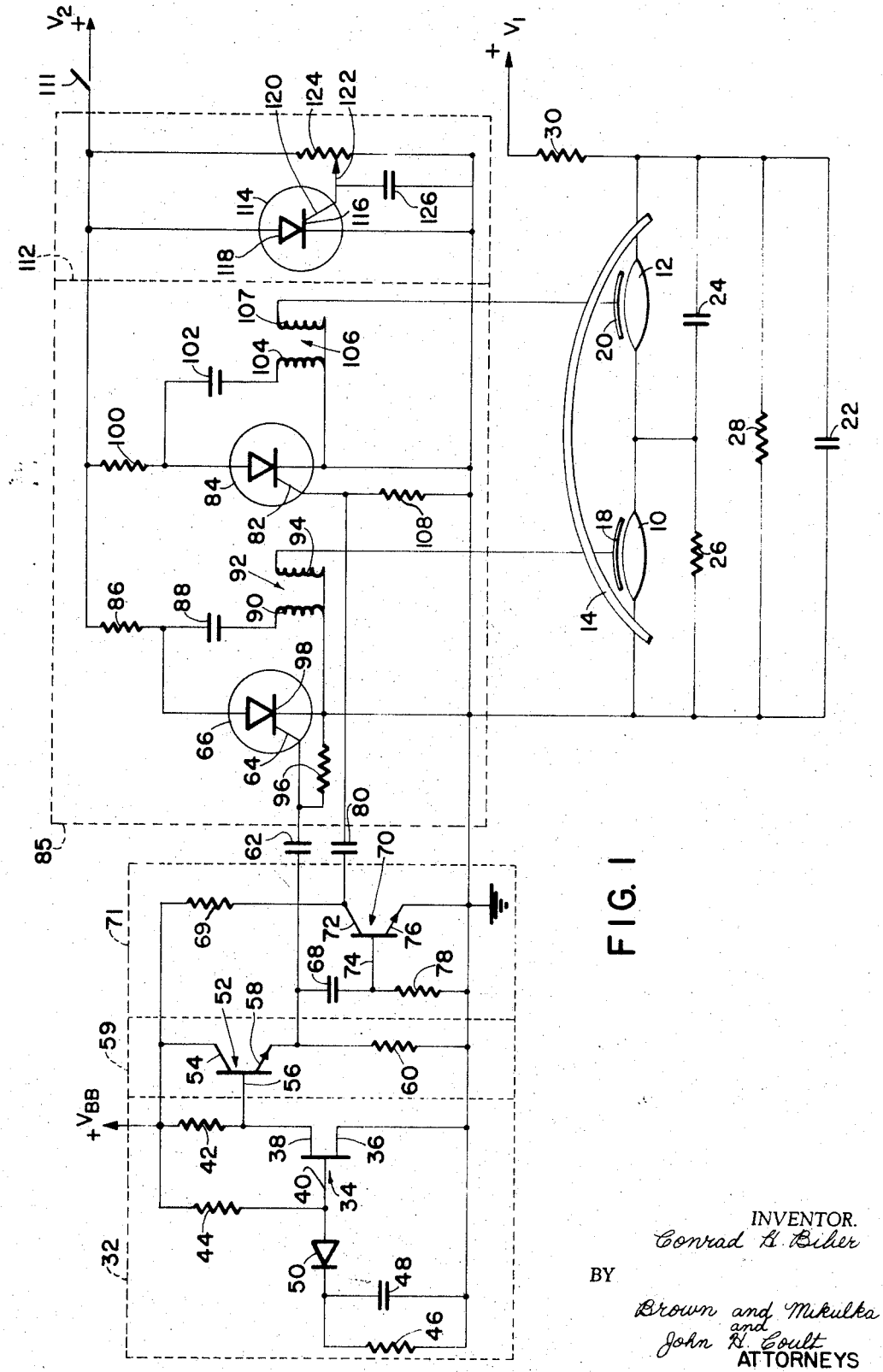
FIGURE 1 is a circuit diagram of a photographic flash apparatus including a pair of discharge tubes and control circuit for controlling the activation of the tubes in accordance with the present invention.

One structural implementation of the invention concept is illustrated schematically in FIGURE 1. A pair of gas-filled electric discharge flash tubes or strobotrons 10, 12 of a known variety are provided for the purpose of producing high intensity light pulses. In photographic applications, the strobotrons 10, 12 would be disposed within a plurality of reflectors or within a single reflector, for example as illustrated diagrammatically at 14. The strobotrons 10, 12 have associated therewith a pair of starter electrodes 18, 20, respectively, upon which are applied high voltage pulses to ionize the gases within the strobotrons 10, 12 to initiate conduction thereof.

Current is supplied to strobotron 10 from a reservoir capacitor 22 connected in parallel across the serially connected strobotrons 10, 12 and to strobotron 12 from a much smaller capacitor 24 connected thereacross. Resistors 26, 28, and 30 have resistance values in the megohm range and are provided as a safety precaution for the purpose of draining capacitors 22, 24 after use of the flash apparatus. The reservoir capacitor is charged initially through resistor 30 from a source of high voltage $V_1$ which may be, for example, in the order 1000 volts.

In order to accomplish an alternate firing of the strobotrons 10, 12 by high voltage pulses applied to the starter electrodes 18, 20, a control circiut is provided. The control circuit including a square wave generator stage 32 comprises a unijunction transistor multivibrator including a unijunction transistor 34 having a base-one electrode 36, a base-two electrode 38 and an emitter electrode 40. A source of bias voltage $V_{BB}$ is applied to the base-two electrode 38 through a bias resistor 42.

The square wave generator includes a timing network having resistor 44 connected from the source of bias voltage $V_{BB}$ to the emitter electrode 40. The timing network also includes a second resistor 46 of the same magnitude as resistor 44 and a capacitor 48. A diode 50 connected between the emitter electrode 40 and the capacitor 48 precludes the capacitor 48 from discharging into the emitter 40 of the transistor 34.

In operation, assuming capacitor 48 to be initially discharged, upon application of the bias voltage $V_{BB}$ capacitor 48 will be charged through a charging circuit comprising forward-biased diode 50, resistor 44, and capacitor 48. As the capacitor 48 is charged, the voltage appearing on the emitter electrode 40 rises exponentially. When the voltage on the emitter electrode 40 reaches the peak point voltage of the unijunction transistor 34, the transistor 34 is triggered into conduction. The voltage of the emitter electrode 40 falls rapidly in accordance with the characteristic of the particular transistor employed.

The drop in the voltage on the emitter electrode 40 causes the diode 50 to be reverse biased. The capacitor 48 then discharges through a discharge circuit including the capacitor 48 and resistor 46. The diode 50 prevents the capacitor 48 from discharging into the emitter of the transistor 34. The capacitor 48 will discharge until the diode 50 again becomes forward bias and conducts. The transistor 34 will be suddenly turned off and the cycle will repeat.

The time during which the transistor 34 conducts is determined by the value of resistor 46; the time during which the transistor 34 is turned off is determined by the value of resistor 44. Hence, the value of resistors 44 and 46 being the same, a symmetrical wave form can be produced. It is manifest that the frequency of the multivibrator is inversely proportional to the capacitance of capacitor 48. The square wave generator thus produces a square wave output at the base-two electrode 38.

The square wave output produced at the base-two electrode 38 is fed into the base of an NPN transistor 52 having collector, base, and emitter electrodes 54, 56, and 58, respectively. The transistor 52 comprises part of an emitter follower stage 59 having a load resistor 60 from which the output of transistor 52 is taken. The output across load resistor 60 is fed through a coupling capacitor 62 to a gate electrode 64 of a silicon-controlled rectifier (SCR) 66, the operation of which will be explained below.

The output across load resistor 60 is also fed through a capacitor 68 to the base electrode of an NPN transistor 70 in a phase inverter stage 71 having collector, base, and emitter electrodes 72, 74, and 76, respectively. The source of bias voltage $V_{BB}$ is connected to the collector electrode 72 of transistor 70 through a resistor 69. Because the output of a grounded emitter transistor amplifier is 180° out of phase with the input, the transistor 70 acts as phase inverter and the signal taken off the collector electrode 72 of transistor 70 is 180° out of phase with the signal taken across the load resistor 60. The output from the transistor 70 is fed through a coupling capacitor 80 to a gate electrode 82 of a second silicon-controlled rectifier (SCR) 84.

The SCR's 66, 84 each constitute an element of parallel pulse generating circuits in a pulse generating stage 85 for generating high voltage trigger pulses to be applied to the starter electrodes 18, 20, of the strobotrons 10, 12. The pulse generating circuit including SCR 66 is powered from a source of relatively high voltage $V_2$ and includes a resistor 86 in series with a capacitor 88 and a primary coil 90 of a transformer 92. A secondary coil 94 of the transformer 92 is coupled to the starter electrode 18 of strobotron 10. The input to the SCR 66 is developed across a resistor 96 connected between the gate electrode 64 and a cathode electrode 98 of the SCR 66.

The pulse generating circuit including SCR 84 includes resistor 100 in series with capacitor 102 and primary coil 104 of transformer 106. A secondary coil 107 of transformer 106 is connected with starter electrode 20 of strobotron 12. The input signal to SCR 84 is developed across resistor 108.

The apparatus illustrated in the FIGURE 1 embodiment of the invention operates to produce a series of light pulses of uniform width and constant frequency and with exponentially decreasing peak amplitudes. Operation of the circuit is initiated by closing a switch 111 which may be the "X" shutter-actuated contacts of a camera with which the flash apparatus is used. As described the square wave generator stage 32 generates a square wave signal which is applied to the emitter follower stage 59. From the emitter follower and phase inverter stages 59, 71 a pair of square wave signals, 180° apart in phase, are applied to the gate electrodes 64, 82 of SCR's 66, 84. These signals alternately fire the SCR's 66, 84 producing high voltage pulses at the output of the secondary coils 94, 107 of transformers 92 and 106. The high voltage pulses, 180° apart in phase, are applied to the starter electrodes 18, 20, of strobotrons 10, 12 to effect an alternate triggering thereof.

The strobotrons 10, 12 are energized as follows. Assume that strobotron 12 is triggered first and that capacitors 22 and 24 are fully charged to the $V_1$ voltage level, for example, 1000 volts. Triggering of strobotron 12 reduces the resistance thereof, allowing capacitor 24 to discharge therethrough to produce a brilliant pulse of light of a width dependent upon the dynamic resistance of strobotron 12 and the capacity of capacitor 24. Although some leakage through the high resistors 26 and 28 occurs, capacitor 22 remains essentially fully charged, because the primary discharge path therefor through capacitor 24 and strobotron 10 is essentially open-circuited.

Upon application of a trigger pulse to strobotron 10, strobotron 10 is rendered conductive and capacitor 22 discharges therethrough until capacitor 24 is again charged to the voltage of reservoir capacitor 22. Strobotrons 10 and 12 are selected to be identical, having the same dynamic resistance. The time required to charge the capacitor 24 through strobotron 10 by the discharge from reservoir capacitor 22 determines the width of the light pulse produced by strobotron 10. It is evident then, since strobotrons 10 and 12 are identical, that the width of the respective light pulses produced by strobotrons 10 and 12 will be the same.

The energy which is discharged from the capacitors 22 or 24 during each pulse is determined by the equation $E=\frac{1}{2}CV_D^2$ where C=the capacitance of the capacitor and $V_D$=the voltage difference between the peak charge voltage and the voltage at which the capacitor ceases to discharge. Capacitor 24 ceases to discharge at the voltage at which the gases within strobotron 12 again become de-ionized. Because capacitor 24 is selected to be much smaller than capacitor 22, for example, by a factor of one hundred, reservoir capacitor 22 is not substantially discharged on the first firing of strobotron 10, but rather is discharged in decrements dependent upon the energy capable of being delivered from capacitor 22 to capacitor 24 after each firing of strobotron 12. Using strobotrons capable of being fired at applied voltages above 250 volts, for example, and a supply $V_1$ of 1000 volts, the voltage across reservoir capacitor 22 will decline exponentially in, for example, one hundred decrements from 1000 volts to 250 volts as the strobotrons 10, 12, are alternately fired. With this invention, by properly selecting the control circuit parameters, the light pulses obtainable with one charge of the reservoir capacitor 22 may be spread out to extend over an interval which is not so brief that light responsive electronic shutters cannot, because of inherent inertial and other mechanical characteristics, respond effectively thereto.

In order that the collective output of the strobotrons 10, 12 may be controlled in a useful manner, time delay means 112 are provided. Referring to FIGURE 1, the time delay means 112 may include a voltage sensitive switching device, for example, a silicon-controlled rectifier (SCR) 114 connected in shunt across the pulse generating stage 85 of the control circuit. The SCR 114 has anode, cathode, and gate electrodes 116, 118, 120, respectively. The gate electrode 120 is connected to the wiper arm 122 of a potentiometer 124 and to a capacitor 126 which in combination with the potentiometer 124 comprises a timing network for developing a time variable voltage on the gate electrode 120 of SCR 114.

The SCR 114 is energized simultaneously with the energization of the pulse generating stage 85. The SCR 114 is fired, and thus caused to shunt the pulse generating stage 85 to terminate the production of voltage pulses on the starter electrodes 18, 20, after a time which is a function of the capacitance of capacitor 126 and the effective resistance of the potentiometer 124, as determined by the relative position of the wiper arm 122.

With time delay means 112 as in FIGURE 1, the production of light pulses can be controlled to extend over a manually preselectable duration.

Alternatively, the effective resistance of the potentiometer 124 may be made a function of the focus of a camera objective lens. FIGURE 2 illustrates one way such a follow-focus arrangement might be constructed. A photographic camera 128 is shown as including a camera back 130, a film access door 131, a bellows 132, a face unit 134 including an objective lens assembly 136 with lens 137, and a focusing linkage including arms 138 and 140 for focusing the objective lens 137 on the appropriate image plane within the camera 128. With a focusing linkage of the type illustrated, the forward end of arm 138 is pinned to the face unit 134, and the forward end of arm 140 travels in a slot 144 in the face unit 134. The forward end of arm 140 is coupled to the wiper arm 122 of the potentiometer 124 in order that the effective resistance of the potentiometer 124 may be a function of the focus of the objective lens 137.

Flash apparatus is illustrated in FIG. 2 as being contained in a housing 146, upon which is mounted a reflector 148 for projecting the light produced by the strobotrons 10 and 12 toward the photographic subject. The wiper arm 122 and the potentiometer 124 are connected into the control circuit for the strobotrons 10, 12 by leads 150, 152, and 154.

With such a follow-focus arrangement, the duration over which the light pulses are produced by the flash apparatus is a function of the distance at which the photographic subject is located from the flash apparatus. The flash apparatus thus tracks the subject.

Flash apparatus having manually preselectable or "follow-focus" control over the flash duration is particularly suited for use with present light sensitive automatic shutter apparatus which is incapable of measuring and responding effectively to the very brief light pulse produced by conventional electronic flash apparatus. With this invention the operator can select manually (or automatically with a properly calibrated follow-focus arrangement) a flash duration which is within the range of flash intervals which the shutter apparatus is designed to handle, for example, 30–50 milliseconds.

In a third embodiment, not shown, of the time delay means 112, the potentiometer 124 may be replaced by a photoresponsive element exposed to light from the photographic subject. In this embodiment the integrating timing network develops a trigger voltage on the gate electrode 120 of SCR 114 after a time dependent upon the level of flash illumination of the photograhic subject. Such an arrangement might be adapted as a substitute for photoresponsive automatically actuated shutter apparatus in a camera with which the flash apparatus is used.

With the FIGURE 1 apparatus, the collective light output of the strobotrons 10, 12 is regulated solely by the control over the duration during which the light pulses are produced. If the energy stored in capacitors 22, 24 remained constant throughout the flash interval, the light output would be a linear function of the time interval over which the pulses are produced. However, as noted above, the peak amplitude of the light pulses produced decreases exponentially with time as the reservoir capacitor 22 undergoes a decremental discharge. Thus, the collective light output of the strobotrons 10, 12 does not increase linearly with time. In addition, the light output required to properly illuminate a photographic subject increases with increasing subject distances. In order to compensate for these effects, frequency varying means may be included in the square wave generator stage 32 to effect an increase in the frequency of the light pulses produced with time.

FIGURES 3 and 4 show exemplary modifications of the square wave generator stage 32 illustrated in FIGURE 1 by which the output of the square wave generator may be made to increase in frequency with time.

In the FIG. 3 embodiment a resistive network is substituted for the resistor 46 in the discharge circuit for capacitor 48. The resistive network includes resistor 156 in series with a photoconductor 158. Resistor 156 determines a minimum resistance of the resistive network when the photoconductor 158 receives optimum photic stimulation. The photoconductor 158 is selected to be of the type having a relatively slow response time. A resistor 160 disposed in parallel with the photoconductor 158 determines the maximum resistance which the resistive network has when the photoconductor 158 receives minimal light stimulation.

Numerous arrangements may be devised for illuminating the photoconductor 158 simultaneously with the initiation of the flash. One satisfactory method is to conduct light to the photoconductor 158 from the strobotrons 10, 12 through an optical fiber 161, as shown in FIG. 3.

With the FIGURE 3 frequency varying means incorporated in the FIGURE 1 circuit, the total resistance of the resistive network is made to vary approximately exponentially by a proper selection of photoconductor 158 from a value representing the sum of resistors 160 and 156 to a value approximating the resistance of resistor 156. Because the resistance of resistor 44 in the charging circuit of the timing network remains constant, the charging time of capacitor 48 will not vary. However, since the resistance of the resistive network will decrease approximately exponentially with time, an asymmetrical wave form will be generated by the square wave generator stage 32.

Figure 5A:
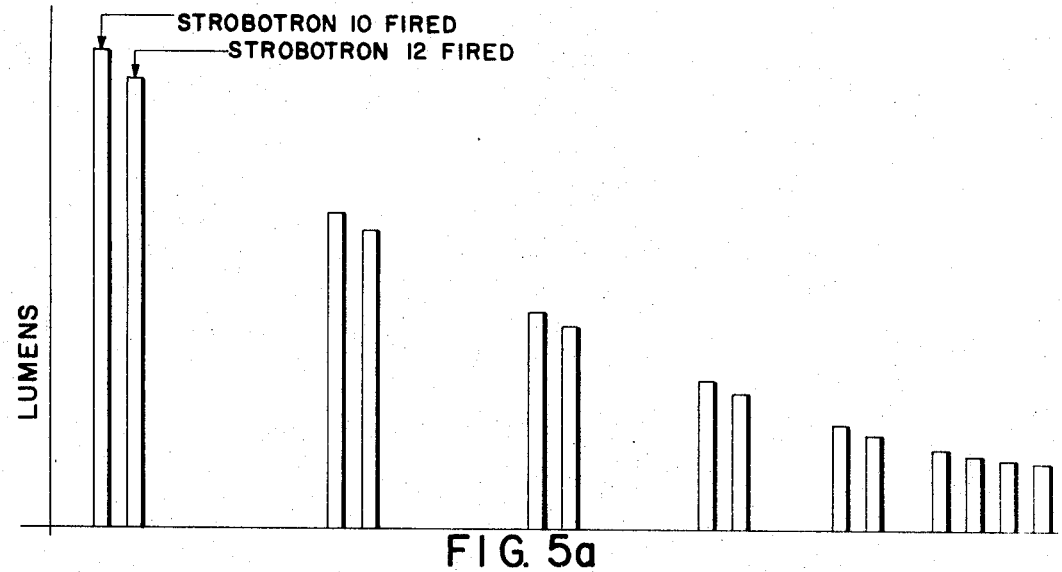
FIG. 5(a) is a diagram representing a pulse intensity vs. time characteristic of one embodiment of the invention.
Figure 5B:
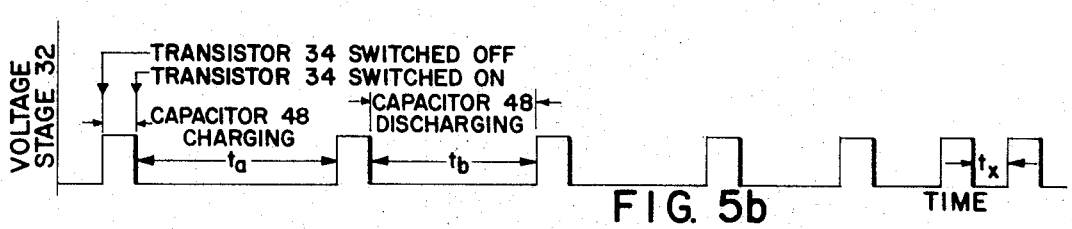
FIG. 5(b) is a diagram of the wave form of the output of the square wave generator stage.

FIG. 5(a) is an intensity vs. time diagram of light pulses produced by flash apparatus incorporating the frequency varying means of FIG. 3. FIG. 5(b) is a diagram of the voltage waveform of the output out of the square wave generator stage 32. FIG. 5(b) reveals clearly the constant charging time of capacitor 48 and the approximately exponentially varying discharging time of capacitor 48. In FIG. 5(b) time intervals $t_a$, $t_b$, $t_x$, representing the discharging times for capacitor 48, are successively diminishing.

FIG. 4 depicts a symmetrical arrangement for varying the frequency of the square wave signal produced by the square wave generator stage 32. In this arrangement a pair of like resistive networks are provided, one network being located in the charging circuit of the timing network and the other network being disposed in the discharging circuit therefor. The resistive network in the charging circuit comprises a resistor 162 in parallel with a series combination of a resistor 164 and a photoconductor 166. The resistive network in the discharging circuit includes a resistor 168 in parallel with the series combination of a resistor 170 and a photoconductor 172. Resistors 162 and 168 determine the minimum charging and discharging currents, respectively. Resistors 164 and 170 determine the maximum charging and discharging current, respectively.

The FIG. 4 embodiment operates similarly to the FIG. 3 embodiment, as described above, however, the employment of identical resistive networks in the charging and discharging circuits of the timing network serves to produce a square wave signal which is more symmetrical than that produced by the FIG. 3 arrangement. See FIG. 6.

Figure 6:
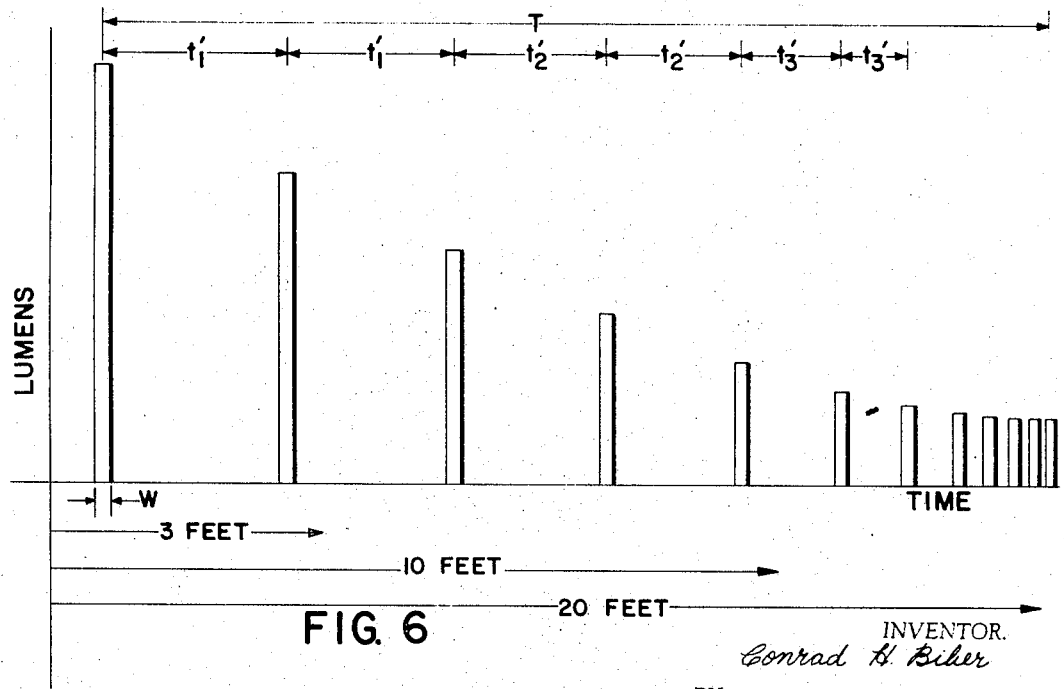
FIG. 6 is a diagram representing a pulse intensity vs. time characteristic of another embodiment of the invention, correlating flash distance with the pulse intensity.

FIG. 6 illustrates the manner in which both the charging times $t_1$, $t_2$, $t_3$ and the discharging times $t'_1$, $t'_2$, $t'_3$ of capacitor 48 in FIG. 4 decrease approximately exponentially during the exposure interval. Time interval $t_1$ is greater than $t'_1$ which in turn is greater than $t_2$, and so forth.

In practice, satisfactory results would be obtained if the parameters of the frequency varying means and the remainder of the control circuit were selected such that the frequency of the light pulses produced varied from 100 cycles per second or less to 1000 or more cycles per second.

In an application wherein flash apparatus embodying the inventive concept were used with a camera having automatic, light-responsive shutter apparatus, T might be in the order of 30–50 milliseconds. The width W of the light pulses may be in the order of 50 microseconds. As in the FIG. 3 embodiment, optical fiber means may be employed for bleeding off some of the light produced by the strobotrons 10, 12 to the photoconductors 166 and 172.

A second abscissa is included to show the relationship of light pulses produced as a function of flash distance by flash apparatus embodying the above described frequency varying means. The diagram clearly reveals that as the flash-to-subject distance increases and the exposure interval lengthens, an ever-increasing number of light pulses will be produced to compensate for the effects of decreasing peak amplitude of the pulses and the rapid drop-off in illumination at increased subject distances.

Certain changes may be made in the above apparatus without departing from the scope of the invention herein involved. For example, a sawtooth wave generator or a pulse generator may be used instead of a square wave generator, as illustrated, to produce the alternate rapid negative and positive changes in voltage on the primary coils 90, 104 of transformers 92, 106 which are required to fire strobotrons 10, 12. It is therefore intended that all matter contained in the above description or shown in the accompanying drawings shall be interpreted as illustrative and not in a limiting sense.

What is claimed is:
1. Photographic flash apparatus comprising:
  discharge tube means for producing a series of light pulses when triggered intermittently into conduction, said tube means including starter electrode means; and
  a control circuit for controlling the light output from said discharge tube means, comprising:
  pulse generating means for generating intermittent trigger pulses on said starter electrode means, and time delay means for terminating the production of light pulses by said discharge tube means in accordance with the illumination requirements of a scene to be photographed, said delay means including a voltage-sensitive switching device shunting said pulse generating means and a timing network including resistance means and capacitance means, said network developing a time variable voltage on a control electrode of said switching device for switching said device into conduction to terminate the production of light pulses after a time dependent upon the values of said resistance and capacitance means.

2. The apparatus defined by claim 1 wherein said resistance means is manually adjustable to provide a series of light pulses extending over a predetermined duration.

3. The apparatus defined by claim 1 wherein said resistance means comprises a photoresponsive element responsive to the level of flash illumination of the scene being photographed.

4. The apparatus defined by claim 1 wherein said pulse generating means include frequency varying means for effecting an increase in the frequency with time of the light pulses produced.

5. In combination:
a photographic camera including an objective lens and focusing means for focusing said lens; and
flash apparatus associated with said camera, comprising:
  discharge tube means for producing a series of light pulses when triggered intermittently into conduction, said tube means including starter electrode means, and
  a control circuit for controlling the light output from said discharge tube means, comprising:
    pulse generating means for generating intermittent trigger pulses on said starter electrode means, and
    time delay means for terminating the production of light pulses by said discharge tube means including a voltage sensitive switching device shunting said pulse generating means and a timing network including capacitance means and variable resistance means cooperating with said focusing means such that the resistance value of said resistance means increases with increasing subject-lens distance, said network developing a time variable voltage on a control electrode of said switching device for switching said device into conduction to terminate said light pulses after a time dependent upon the product of the values of said resistance and capacitance means.

6. Photographic flash apparatus comprising:
discharge tube means for producing a series of light pulses when triggered intermittently into conduction, said tube means including starter electrode means; and
a control circuit for controlling the light output from said discharge tube means, comprising:
  square wave generating means including a period timing network comprising capacitance means and resistance means, said resistance means including frequency varying means whose resistance decreases with time over the flash duration for effecting an increasing frequency of the square wave output signal generated by said square wave generating means, and
  pulse generating means responsive to said square wave output signal of said square wave generating means for generating trigger pulses on said starter electrode means at each step of the square wave signal, whereby said discharge tube means produces light pulses increasing in frequency with time.

7. The apparatus defined by claim 6 wherein said frequency varying means includes a photoresponsive element.

8. The apparatus defined by claim 6 wherein said frequency varying means has a resistance characteristic decreasing approximately exponentially with time.

9. The apparatus defined by claim 8 wherein said frequency varying means includes an R-C timing network.

10. The apparatus defined by claim 6 wherein said capacitance means in said period timing network is a common element in symmetrical charging and discharging circuits, the resistance means in said charging and discharging circuits comprising photoresponsive elements for effecting an approximately exponentially increasing period of the square wave signal generated by said square wave generating means.

11. The apparatus defined by claim 6 including time delay means for terminating the production of light pulses by said discharge tube means in accordance with the illumination requirements for a proper exposure of the scene being photographed.

12. The apparatus defined by claim 11 wherein said time delay means includes a silicon-controlled rectifier shunting said pulse generating means and a second timing network including second resistance means and second capacitance means, said second network developing a time variable voltage on a gate electrode of said rectifier for switching said rectifier into conduction to terminate the production of light pulses after a time dependent on the values of said second resistance and capacitance means.

13. The apparatus defined by claim 12 wherein said second resistance means is manually adjustable to provide a series of light pulses extending over a predetermined duration.

14. The apparatus defined by claim 13 wherein said frequency varying means include a photoresponsive element.

15. The apparatus defined by claim 12 wherein said second resistance means includes a photoresponsive element responsive to the level of flash illumination of the scene being photographed.

16. The apparatus defined by claim 12 wherein said frequency varying means has a resistance characteristic decreasing approximately exponentially with time.

17. Photographic flash apparatus comprising:
first and second serially connected discharge tube means for producing, in alternation, a series of light pulses when triggered alternately into conduction, said first and second tube means including starter electrode means;
energization means for providing a source of high current for said first and second discharge tube means, comprising:
  a reservoir capacitor connected across both of said tube means,
  conductor means for conducting current from a source of electrical power to said reservoir capacitor for recharging said capacitor, and
  a second capacitor connected across said first discharge tube means;
a control circuit for controlling the light output from said first and second discharge tube means, comprising:
  square wave generating means including a period timing network comprising capacitance means and resistance means, said resistance means including frequency varying means whose resistance decreases with time over the flash duration for effecting an increasing frequency of the square wave output signal generated by said square wave generating means, and
    voltage pulse generating means, including a phase inverter stage, responsive to said square wave output signal of square wave generating means for generating trigger pulses at each step of said square wave signal and applying them alternately to said starter electrode means of said first and second discharge tube means, whereby, in sequence, said first discharge tube means is energized by said second capacitor to produce a light pulse upon triggering of said first tube means and said second tube means is energized by said reservoir capacitor through said second capacitor to produce a light pulse upon triggering of said second tube means, said pulses increasing in frequency with time; and time delay means for terminating the production of light pulses by said first and second discharge tube means in accordance with the illumination requirements for a proper exposure of the scene being photographed.

18. The apparatus defined by claim 17 wherein said time delay means includes a silicon-controlled rectifier shunting said pulse generating means and a second timing network including second resistance means and second capacitance means, said second network developing a time variable voltage on a gate electrode of said silicon-controlled rectifier for switching said rectifier into conduction to terminate the production of light pulses after a time dependent on the values of said second resistance and capacitance means.

19. The apparatus defined by claim 18 wherein said second resistance means is manually adjustable to provide a series of light pulses extending over a predetermined duration.

20. The apparatus defined by claim 18 wherein said second resistance means includes a photoresponsive element responsive to the level of flash illumination of the scene being photographed.

21. The apparatus defined by claim 20 wherein said frequency varying means has a resistance characteristic decreasing approximately exponentially with time.

22. The apparatus defined by claim 21 wherein said frequency varying means includes a photoresponsive element.

References Cited

UNITED STATES PATENTS

| | | | |
|---|---|---|---|
| 2,313,317 | 10/1943 | Germeshausen | 315—241 |
| 3,031,599 | 4/1962 | Paschke et al. | 315—241 |
| 3,294,002 | 12/1966 | Vitkine | 95—11.5 |
| 3,296,947 | 1/1967 | Engelsmann et al. | 95—11.5 XR |
| 3,296,949 | 1/1967 | Bounds | 95—11 |

NORTON ANSHER, *Primary Examiner.*

F. L. BRAUN, *Assistant Examiner.*

U.S. Cl. X.R.

315—241

U.S. DEPARTMENT OF COMMERCE
PATENT OFFICE
Washington, D.C. 20231

UNITED STATES PATENT OFFICE
CERTIFICATE OF CORRECTION

Patent No. 3,438,766 April 15, 1

Conrad H. Biber

It is certified that error appears in the above identified patent and that said Letters Patent are hereby corrected as shown below:

Column 3, line 8, cancel "are", second occurrence; line 10, "and" shou read -- an --; line 57, after "invention" insert -- and --; line 58, "inven should read -- inventive --. Column 4, line 7, "circiut" should read -- ci --. Column 10, line 52, "connectod" should read -- connected --. Column 1 line 13, "2,313,317" should read -- 2,331,317 --.

Signed and sealed this 14th day of April 1970.

(SEAL)
Attest:

Edward M. Fletcher, Jr.　　　　　　　　　　WILLIAM E. SCHUYLER, JI
Attesting Officer　　　　　　　　　　　　　　Commissioner of Patents